United States Patent [19]

Gassmann

[11] Patent Number: 5,706,923
[45] Date of Patent: *Jan. 13, 1998

[54] METHOD OF AND DEVICE FOR CONTROLLING A COUPLING

[75] Inventor: Theodor Gassmann, Siegburg, Germany

[73] Assignee: GKN Automotive AG, Lohmar, Germany

[*] Notice: The term of this patent shall not extend beyond the expiration date of Pat. No. 5,526,912.

[21] Appl. No.: 609,249

[22] Filed: Mar. 1, 1996

Related U.S. Application Data

[63] Continuation of Ser. No. 292,074, Aug. 17, 1994, Pat. No. 5,526,912.

[30] Foreign Application Priority Data

Aug. 17, 1993 [DE] Germany ................ 43 27 519

[51] Int. Cl.⁶ .......... B60K 17/35; F16D 43/284; F16D 25/0638
[52] U.S. Cl. .......... 192/57; 192/58.42; 192/58.5; 192/85 AA
[58] Field of Search .......... 192/35, 57, 58.4, 192/58.42, 58.43, 58.5, 85 AA, 103 F, 103 FA

[56] References Cited

U.S. PATENT DOCUMENTS

| | | |
|---|---|---|
| 4,012,968 | 3/1977 | Kelbel . |
| 4,058,027 | 11/1977 | Webb . |
| 4,224,838 | 9/1980 | Roushdy et al. . |
| 4,836,051 | 6/1989 | Guimbretiere . |
| 4,874,058 | 10/1989 | Kwoka .......... 180/248 |
| 4,905,808 | 3/1990 | Tomita et al. . |
| 4,966,268 | 10/1990 | Asano et al. . |
| 4,982,808 | 1/1991 | Taureg et al. . |
| 5,007,515 | 4/1991 | Shimizu . |
| 5,007,885 | 4/1991 | Yamamoto et al. . |
| 5,012,908 | 5/1991 | Kobayashi et al. . |
| 5,031,743 | 7/1991 | Morishita et al. . |
| 5,036,963 | 8/1991 | Murata . |
| 5,056,640 | 10/1991 | Yamamoto . |
| 5,063,738 | 11/1991 | Asano et al. . |
| 5,070,975 | 12/1991 | Tanaka et al. . |
| 5,080,187 | 1/1992 | Asano et al. . |
| 5,127,503 | 7/1992 | Gratzer . |
| 5,129,870 | 7/1992 | Pierce . |
| 5,178,249 | 1/1993 | Haga et al. . |
| 5,197,583 | 3/1993 | Sakai et al. . |
| 5,259,488 | 11/1993 | Oberdörster et al. . |
| 5,261,862 | 11/1993 | Pierce . |
| 5,267,916 | 12/1993 | Beim et al. . |
| 5,526,912 | 6/1996 | Gassmann ................ 192/57 |
| 5,556,343 | 9/1996 | Gassmann et al. ......... 192/85 AA X |

FOREIGN PATENT DOCUMENTS

| | | |
|---|---|---|
| 0247008 | 5/1987 | European Pat. Off. . |
| 0347165 | 6/1989 | European Pat. Off. . |
| 480175 | 9/1991 | European Pat. Off. . |
| 0549828 | 12/1991 | European Pat. Off. . |
| 0639730 | 8/1994 | European Pat. Off. . |
| 938813 | 7/1949 | Germany . |
| 4103054 | 8/1991 | Germany . |
| 4032245 | 3/1992 | Germany . |
| 63-199934 | 8/1988 | Japan . |
| 64-87928 | 4/1989 | Japan . |
| 1-126440 | 5/1989 | Japan . |
| 1-220728 | 9/1989 | Japan . |
| 2-51626 | 2/1990 | Japan . |
| 2-120529 | 5/1990 | Japan . |
| 2-120530 | 5/1990 | Japan . |
| 4-145239 | 5/1992 | Japan . |
| 2202602 | 9/1988 | United Kingdom . |
| 2222232 | 2/1990 | United Kingdom . |

*Primary Examiner*—Richard M. Lorence
*Attorney, Agent, or Firm*—Dinnin & Dunn, P.C.

[57] ABSTRACT

A coupling for transmitting torque between two parts has a friction or viscous coupling. The friction coupling is loaded by a piston and rotational member. A shear channel is formed between faces such that viscous fluid contained in the chamber is moved along the shear channels wherein the piston is loaded as a result of shear forces.

5 Claims, 10 Drawing Sheets

METHOD OF AND DEVICE FOR CONTROLLING A COUPLING

This is a continuation application of application Ser. No. 08/292,074 filed Aug. 17, 1994 now U.S. Pat. No. 5,526,912.

DESCRIPTION

The invention relates to a method of controlling a coupling for transmitting torque between two parts which are rotatable relative to one another, which coupling comprises a friction coupling whose friction elements are alternately non-rotatably connected to the one and the other of the rotatable parts, with the friction coupling being loaded by at least one adjustable piston which delimits a chamber filled with a viscous fluid; the invention also relates to a coupling which is suitable for carrying out said method and for transmitting torques between two parts which are rotatable relative to one another, which coupling comprises a friction coupling whose friction elements are alternately non-rotatably connected to the one and the other of the rotatable parts, with the friction coupling being loaded by at least one movable piston which delimits a chamber which is filled with a viscous fluid, whose rotational housing is formed by the one of the rotatable parts and the piston rotating therewith and in which there rotates a rotational member connected to the other rotatable parts. The viscous fluid is meant to be one with a high viscosity such as it is commonly used in viscous couplings for example.

A method and a coupling of this type are known from JP 63-240429 A, where, in the case of a speed differential between the rotatable parts, a disc which is star-shaped in an axial view rotates in a chamber filled with a viscous fluid. Between the disc and the housing, a dynamic pressure is built up in the fluid and acts on the piston which delimits the chamber and which actuates the friction coupling. There are very few possibilities of varying the characteristics of said coupling as a function of the differential speed; basically, only the filling level and the viscosity of the viscous fluid are freely selectable. A further disadvantage refers to the low achievable pressure level and the resulting low performance density.

Furthermore, the invention relates to a method of controlling a coupling for transmitting torque between two parts which are rotatable relative to one another, which coupling comprises a viscous coupling whose plates are axially alternately non-rotatably connected to the one and the other of the rotatable parts and are arranged in a chamber filled with a viscous fluid, with the viscous coupling being controllable by changing the pressure or volume in the chamber; the invention also relates to a coupling suitable for carrying out said method and for transmitting torques between two parts which are rotatable relative to one another, said coupling comprising a viscous coupling whose plates are alternately non-rotatably connected to the one and the other of the rotatable parts and are arranged in a chamber which is filled with a viscous fluid, which is formed by the parts rotatable relative to one another and which is provided with a compensation chamber from which, for volume and pressure increasing purposes, viscous fluid may be conveyed into the interior of the chamber of the viscous coupling.

Such a method and such a coupling are known from DE 37 01 884 C1. The compensation chamber is positioned in the hub of the viscous coupling and is variable by means of an adjusting piston. To be able to influence the characteristics of the coupling, it is necessary to provide an external control unit, which involves special expenditure.

Assemblies of the said type are used in the drivelines of motor vehicles and land machinery for the purpose of generating a differential-speed-dependent locking moment between two parts rotating relative to one another.

In a first application, such an assembly is used in differential drives where the coupling is arranged between parts which rotate relative to one another when differential processes occur in the drive. The coupling provides such differential drives with a partial locking effect. Such differential drives are preferably axle differentials or central differentials in motor vehicles.

In a second application, the coupling is used directly in a shaft connection between two directly driven driving parts, for example in a motor vehicle, with the coupling being used directly in a driveline associated with an axle driven only from case to case. The coupling ensures that the respective driveline is torque loaded if there occurs a speed differential between the associated axle and a permanently driven further axle, whereas the coupling keeps the driveline torque-free if the axles rotate at the same speed; the axle of said driveline follows freely.

As compared to torque sensing systems, differential speed sensing couplings of the type referred to here have considerable advantages in respect of traction and driving dynamics.

It is therefore the object of the present invention to provide a differential speed sensing coupling in a simple design with a high performance density and with a wide range of selectable characteristics.

The first solution is based on the state of the art as described in the initially mentioned publication and consists of a method and device according to the first independent claims 1 and 3 referring to a method and device. A second solution in accordance with the invention is based on the state of the art as described in the second of the said publications and consists in a method according to the second independent claim 2 referring to a method.

All solutions are based on a common pressure drag flow operating principle based on two media being sheared between two plates which are moved relative to one another. In the case of such a relative movement, part of the medium, always with reference to one of the plates, is conveyed in the direction of the movement of the other plates. If a gap between two plates is laterally sealed substantially in parallel with the direction of relative movement there is produced a shear channel which, as a function of the distance and direction of the relative movement conveys fluid from one end of the shear channel produced in this way to its other end. The conveying pressure is directly proportional to the length of the shear channel, the viscosity of the sheared medium and the shear rate, i.e., to the relative speed. If the shear channel is suitably arranged in such a way that it connects two chambers with one another, with the two members forming the shear channel being connected to the one and the other of the rotating parts of a coupling, there is generated a differential-speed-dependent conveying pressure which may be utilised in different ways. In a first application, the conveying pressure loads a chamber which acts on at least one piston which, in turn, loads the friction elements of a friction coupling. A second application consists in that the medium is conveyed directly into the chamber of a viscous coupling, thereby increasing the pressure in the chamber and the filling level in the chamber so that the coupling characteristics change.

The pressure in a shear channel which is formed by a circumferentially delimited groove in one of the parts and by a covering face in the other part, with reference to the direction of relative rotation of the first of the parts accommodating the groove relative to the second part, is built up from the front end to the rear end of the groove.

In order to ensure optimum reproducible functioning of the device, it is essential for the chamber delimited by the piston to be filled completely. In particular, this has to be ensured if thermal fluctuations lead to a change in volume of the viscous fluid or if in operation, due to a piston movement caused by the wear of friction faces for example, there occurs a change in volume of the chamber delimited by the piston.

It is therefore the object of preferred embodiments to provide means which ensure that the chamber is uniformly and completely filled at all times.

In one embodiment, the size of the volume of the reservoir is variable and there are provided control elements for mutually closing and opening the connections between the beginnings of the two shear channels and the reservoir as a function of the direction of relative rotation of the rotational member relative to the rotational housing and piston. The reservoir whose volume is variable in size ensures that the chamber and especially the shear channels are permanently filled completely. The control elements prevent the pressure end of the rotational member in the chamber from influencing the reservoir, i.e. they prevent any pressurised fluid from returning to the reservoir.

The control elements may be provided in the form of automatically acting, especially non-pretensioned return valves. In a preferred embodiment, the valve members of both control elements may consist of one piece.

In principle, the reservoir may be arranged in two ways: it may be arranged in the rotational member or in the rotational housing. In the latter case, an annular groove in the rotational member and/or in the rotational housing has to provide a permanently open connection with the chamber.

In the case of one reservoir embodiment which is particularly suitable for being arranged in the rotational member, the reservoir contains a gas-proof, gas-filled resilient hollow member for resiliently compensating for any change in volume.

A further advantageous reservoir embodiment consists in that the reservoir contains a resilient solid member whose volume is variable, which is especially made of foam and which comprises a gas-proof surface for the above-mentioned purpose.

In one reservoir embodiment which is suitable for being accommodated in both the rotational member and in the rotational housing, the reservoir is delimited by a gas-proof, flexible membrane which is movable against a returning force and which, on its reverse side, is loaded by a plate spring or by other spring means.

A further advantageous embodiment of the reservoir consists in the reservoir being delimited by a sealed movable wall, especially an annular piston, which, again, is supported by spring means on its reverse side.

The invention also relates to motor vehicles equipped with couplings as claimed in accordance with the invention.

Advantageous further developments of the said solutions are contained in the subclaims referring to the independent claims. To make it easier to understand the new type of operating principle and to explain preferred embodiments, reference will be made below to the drawings wherein:

Figure 3:
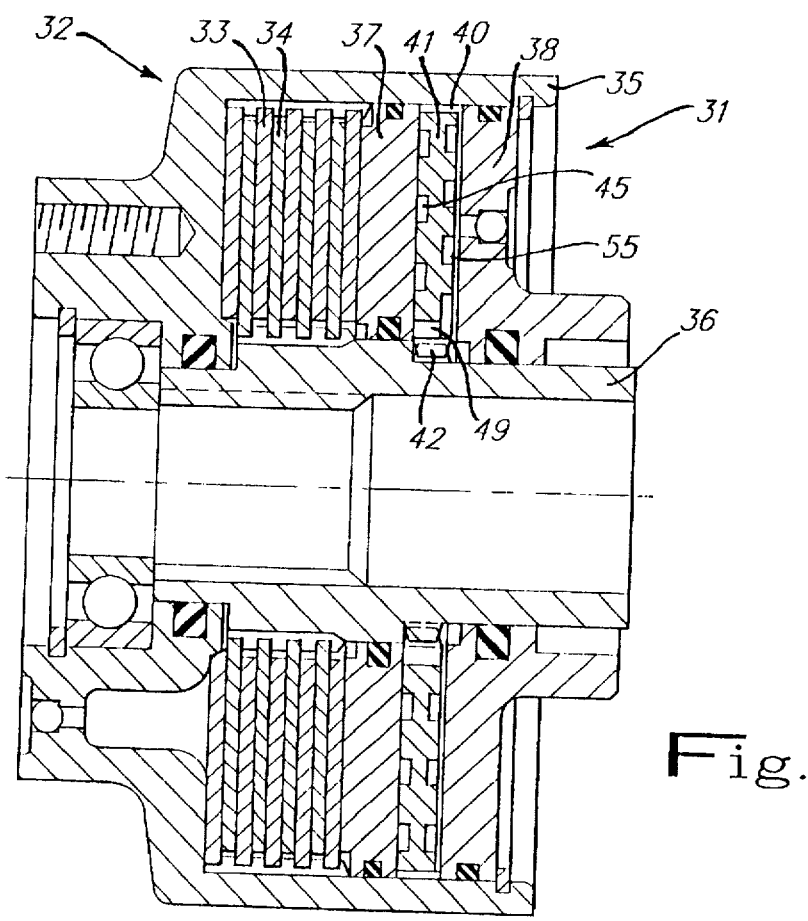
FIG. 3 is a longitudinal section through a first embodiment of a coupling in accordance with the invention.
Figure 5A:
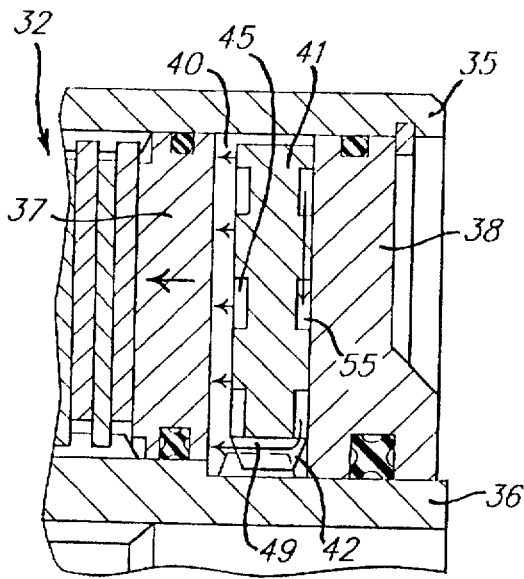
Figure 5B:
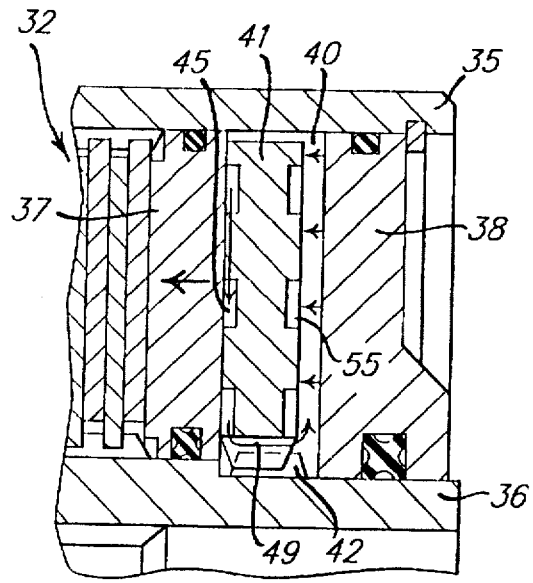

FIG. 5 explains the operating principle with reference to details of the coupling according to FIG. 3:

a. in the case of a first direction of relative rotation;

b. in the case of a second direction of relative rotation.

Figure 6:
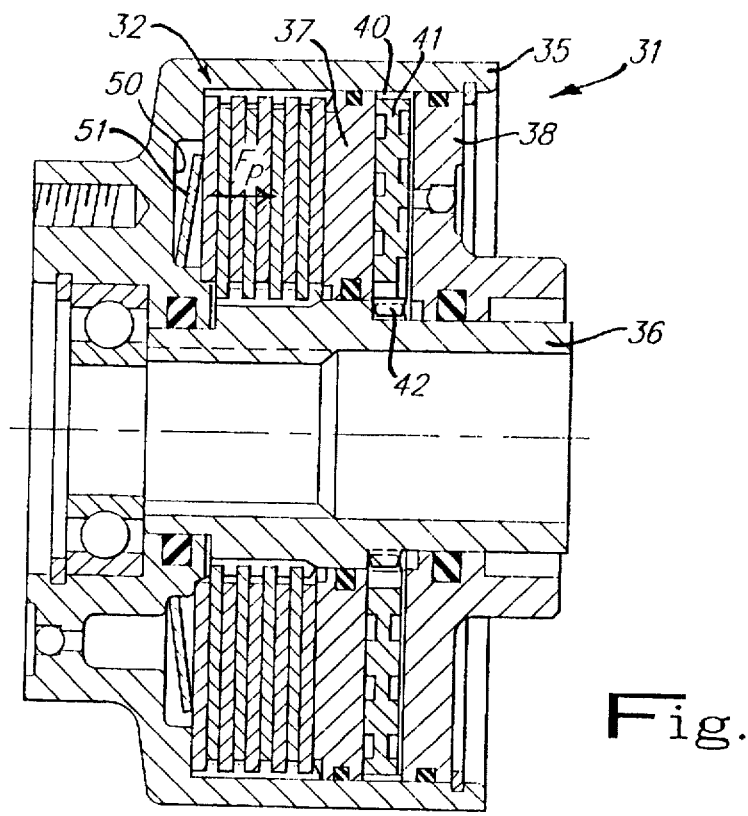

FIG. 6 is a longitudinal section through a second embodiment of a coupling in accordance with the invention.

Figure 7:
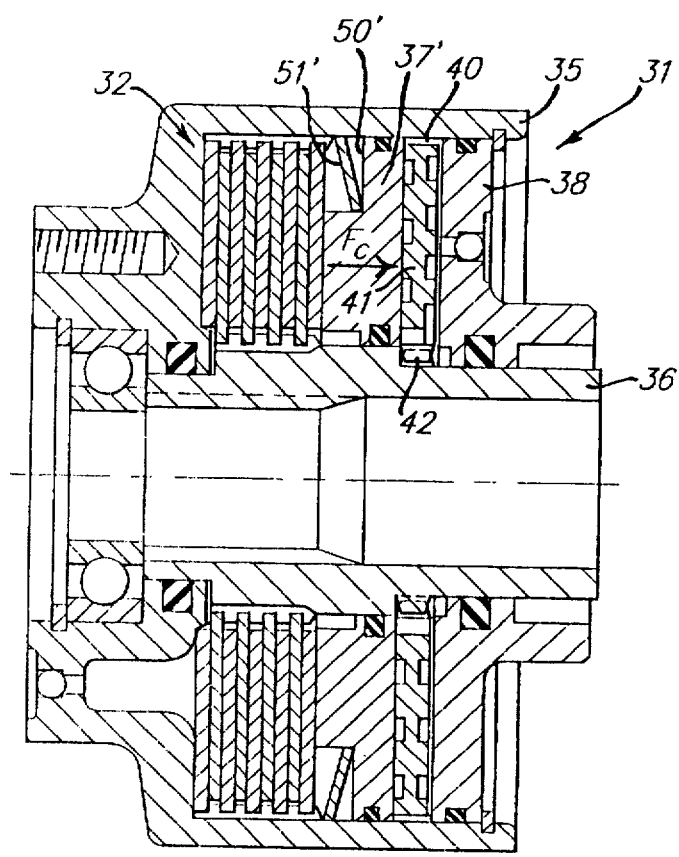

FIG. 7 is a longitudinal section through a third embodiment of a coupling in accordance with the invention.

FIG. 8 shows details of a coupling according to the first solution, including control elements:

a. in the form of a valve actuated by centrifugal forces;

b. in the form of an externally actuated slide.

Figure 9A:
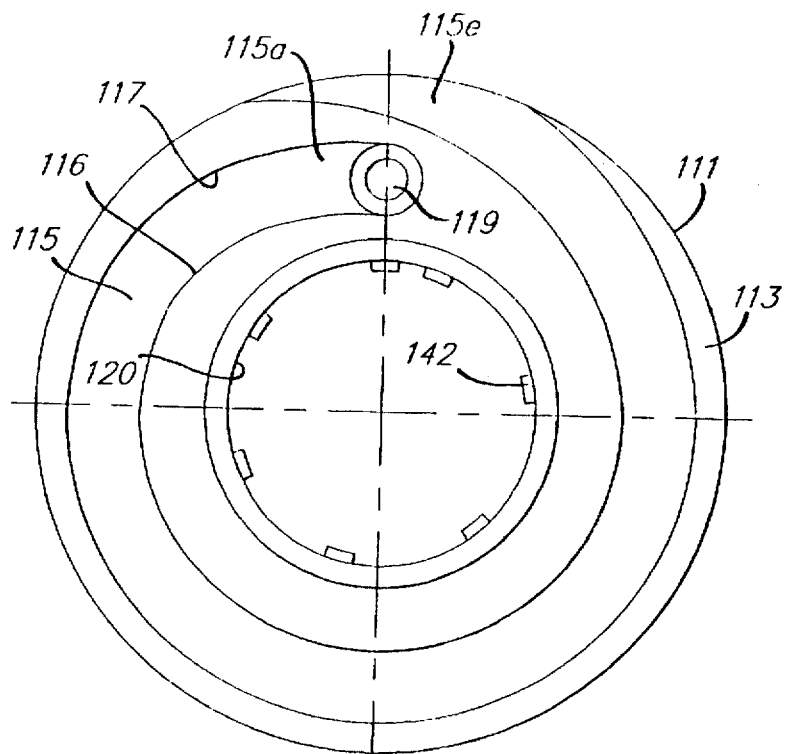
Figure 9B:
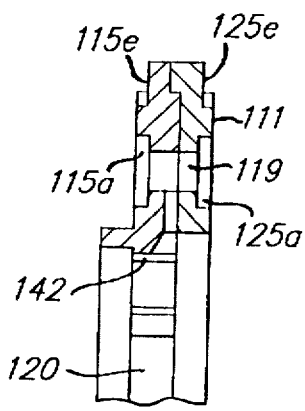

FIG. 9 shows a second embodiment of a disc which forms the rotational member of a coupling in accordance with the invention, whose first end face is provided with a first groove forming a shear channel and whose second end face is provided with a second groove forming a shear channel:

a) in a plan view;

b) in half a longitudinal section.

Figure 10:
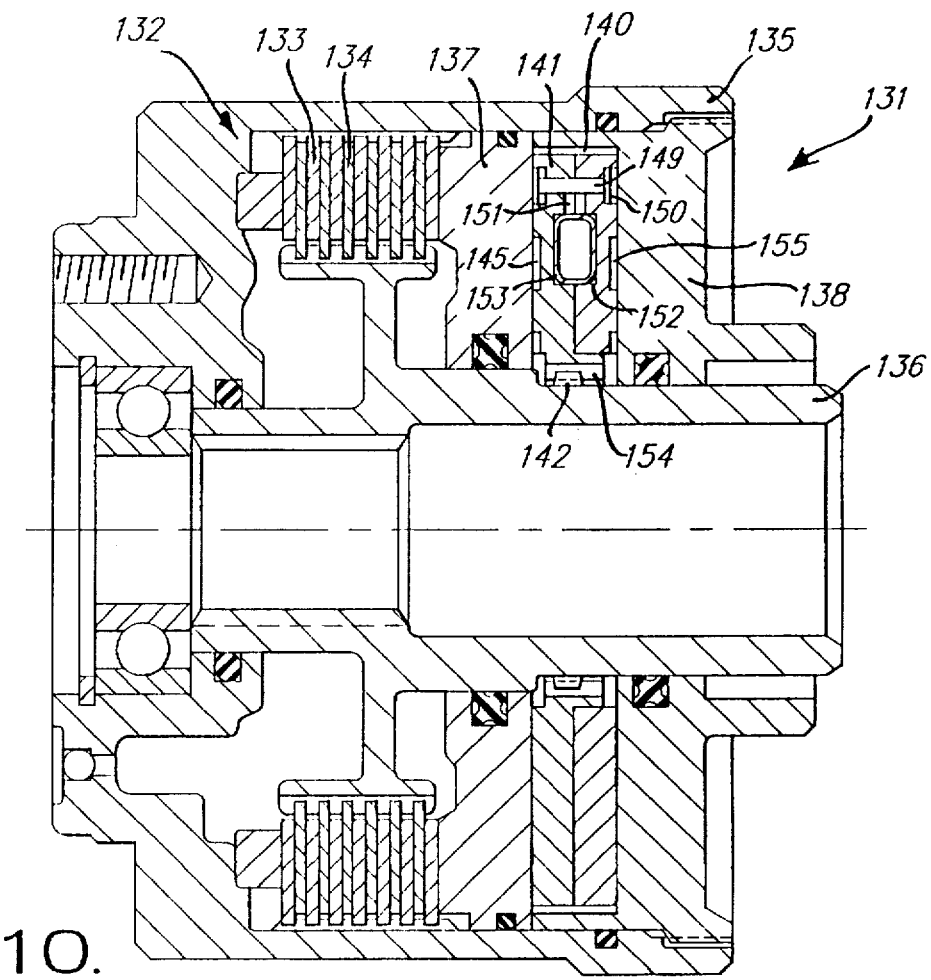

FIG. 10 is a longitudinal section through a fourth embodiment of a coupling in accordance with invention.

FIG. 11 shows details of various modifications of the discs according to FIG. 10 forming the rotational member of a coupling in accordance with the invention:

a) having a pressure-proof hollow member in the reservoir;

b) having a spring-loaded membrane in the reservoir;

c) having a spring-loaded annular member in the reservoir;

d) having in the reservoir a solid member whose volume is variable.

Figure 12:
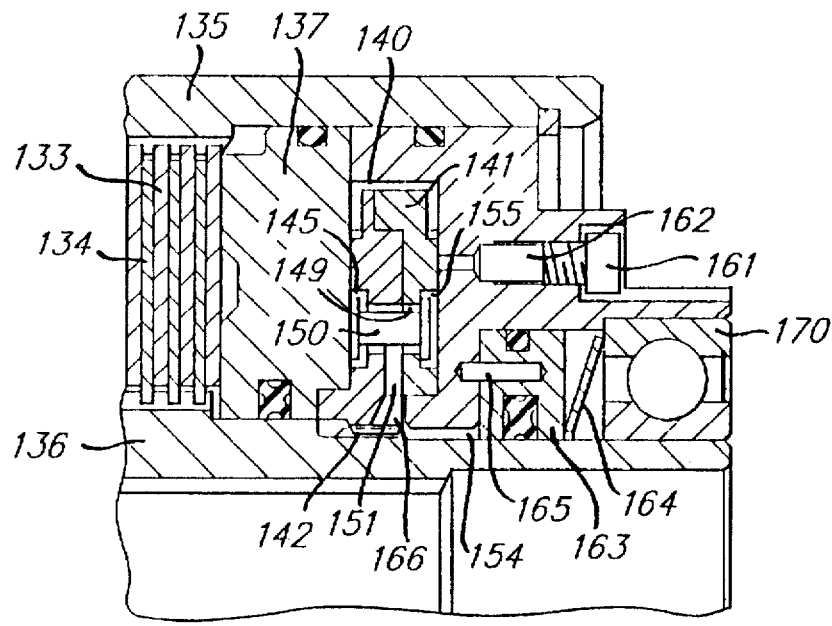

FIG. 12 is half a longitudinal section through a fifth embodiment of a coupling in accordance with the invention.

Figure 13:
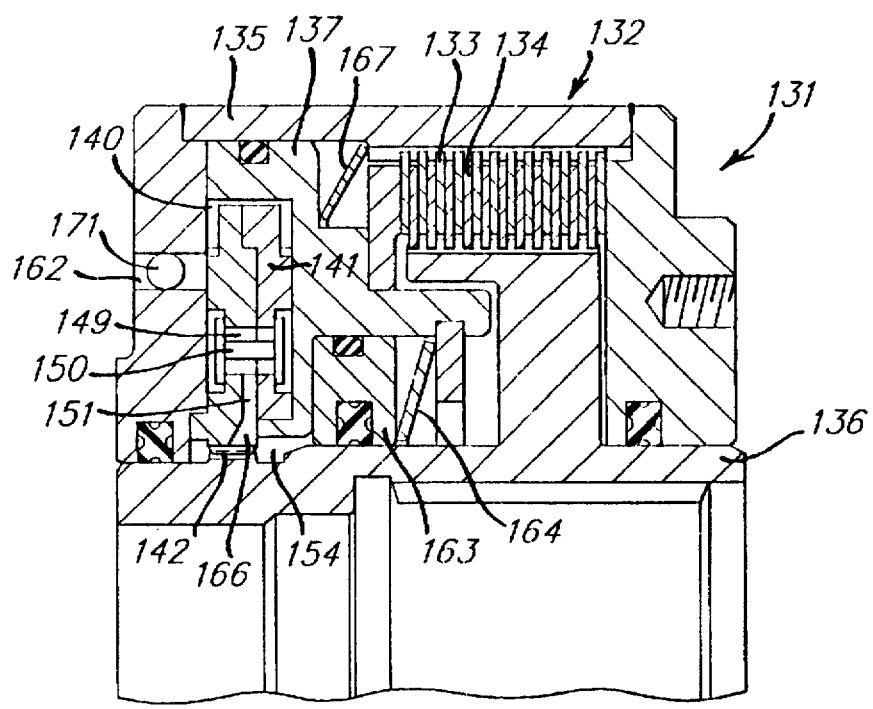

FIG. 13 is half a longitudinal section through a sixth embodiment of a coupling in accordance with the invention, giving a detail.

Figure 14:
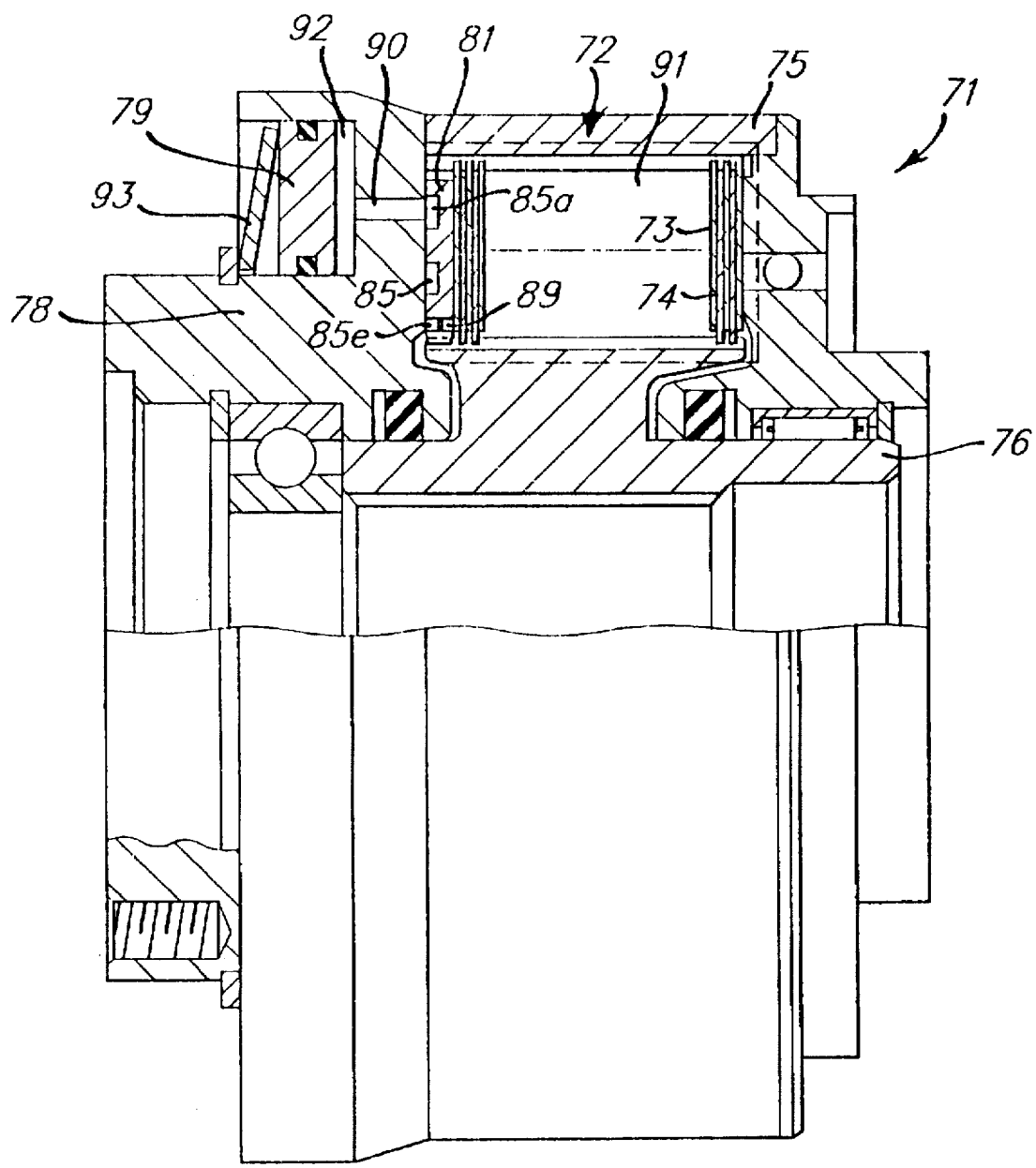

FIG. 14 is a longitudinal section of a coupling in accordance with the invention, with a viscous coupling.

Figure 15:
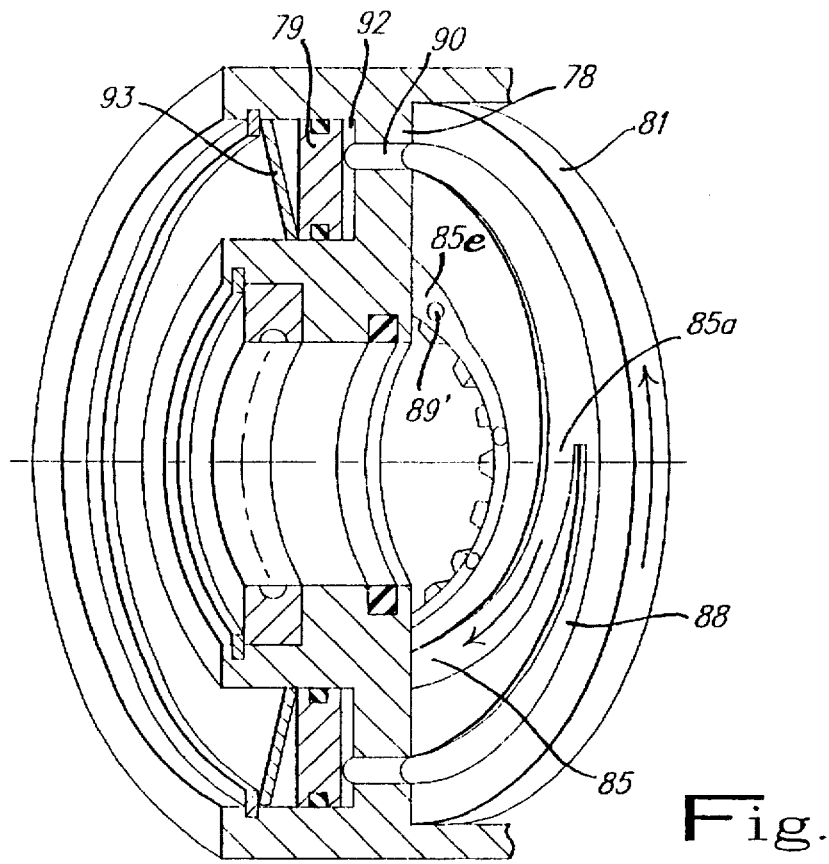

FIG. 15 shows details of a coupling according to FIG. 14 in an inclined view, with part of a rotational part being cut away.

Figure 16:
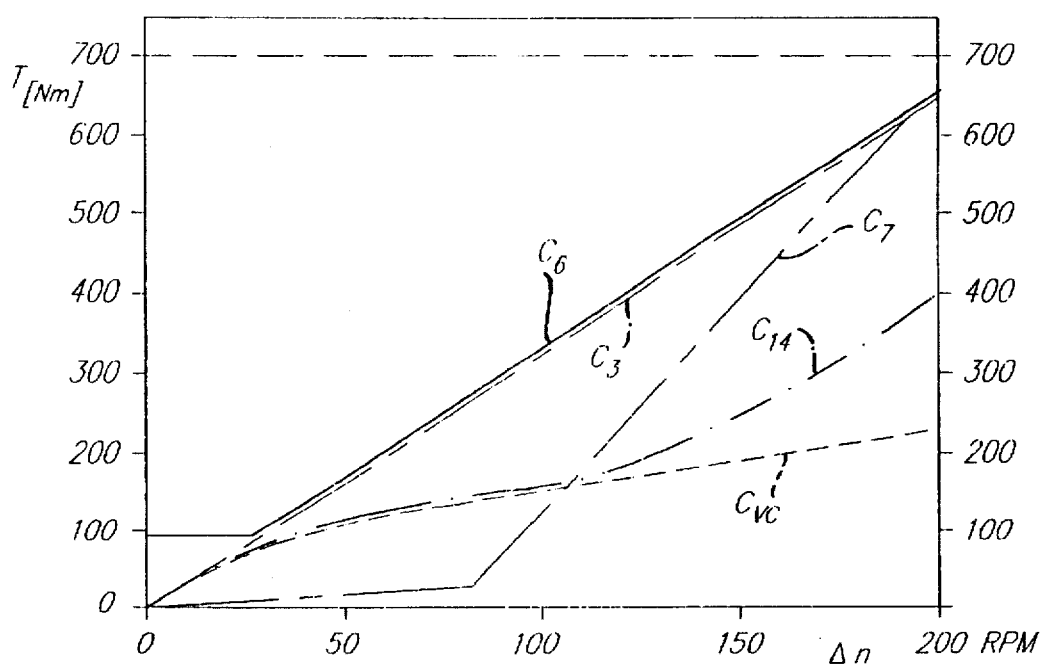

FIG. 16 is a diagram with torque characteristics as a function of the differential speed for several types of coupling.

Figure 17:
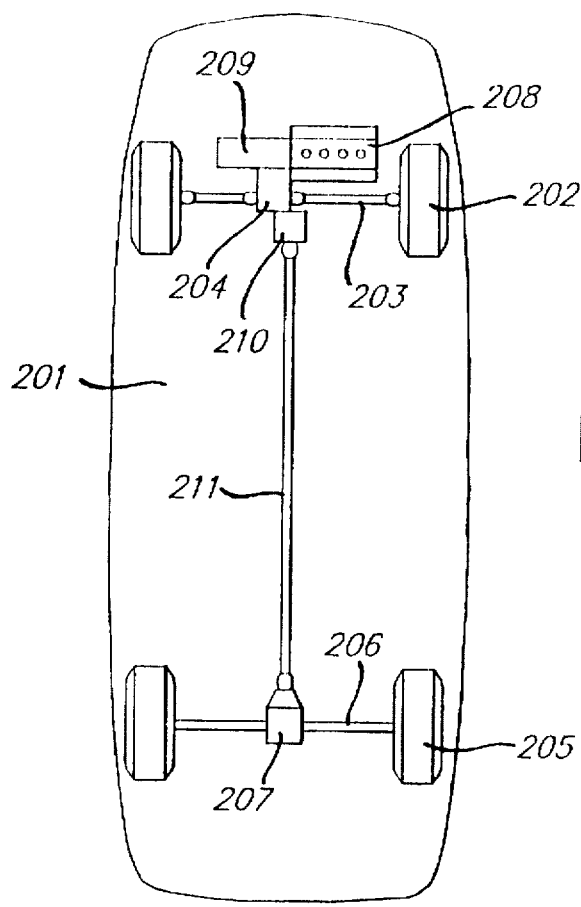

FIG. 17 shows a motor vehicle with a coupling in accordance with the invention in a diagrammatic view in a first embodiment.

Figure 18:
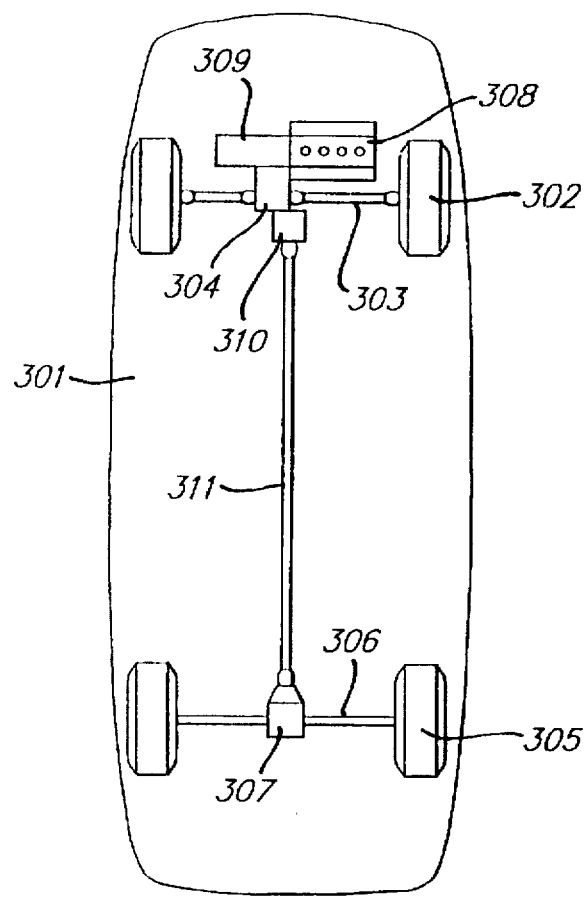

FIG. 18 shows a motor vehicle with a coupling in accordance with the invention in a diagrammatic view in a second embodiment.

Figure 1:
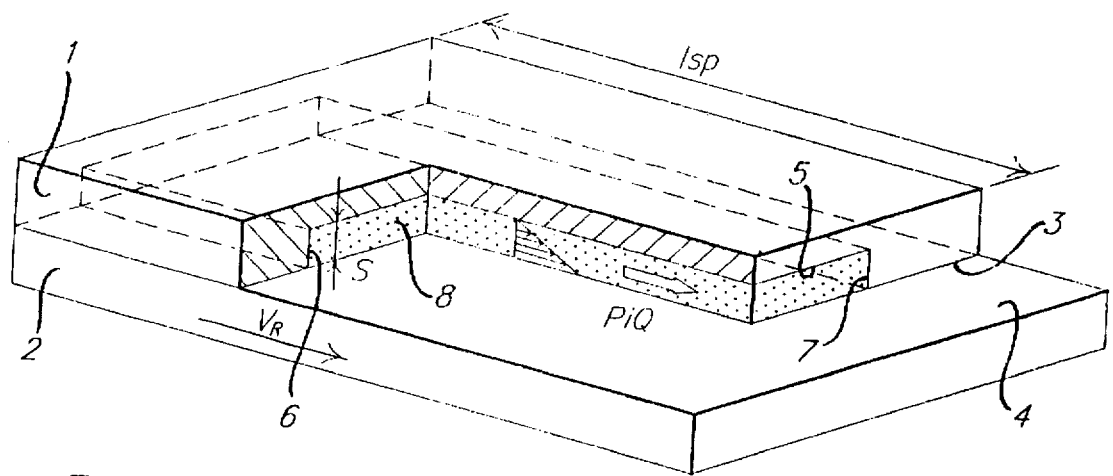
FIG. 1 shows two plates which are movable relative to one another, with a section having been broken away and with one of the plates having been provided with a groove forming a shear channel.

FIG. 1 shows that a section has been broken away from a first plate or disc 1 and a second plate or disc 2 whose end faces 3, 4 contact one another. The first plate 1 is assumed to be fixed whereas the second plate 2 moves relative thereto at a speed $V_R$. The first end face 3 of the first plate 1 is provided with a groove 5 which has a rectangular cross-section and comprises laterally delimiting walls 6, 7. The groove 5 and end face 3 form a shear channel which accommodates a viscous medium. The shear channel comprises the length $l_{SP}$ and the height or depth s. When the plate 2 moves, the medium in the shear groove behaves in accordance with the linear speed profile as shown, which refers to the fixed plate 1. The surfaces of plate 1 as well as of plate 2 are, of course, subject to adhesion conditions. With reference to plate 2, the speed profile would be reciprocal. With reference to plate 1, the shear channel, as a result of the shearing effect, features a pressure p and a volume flow Q.

Figure 2:
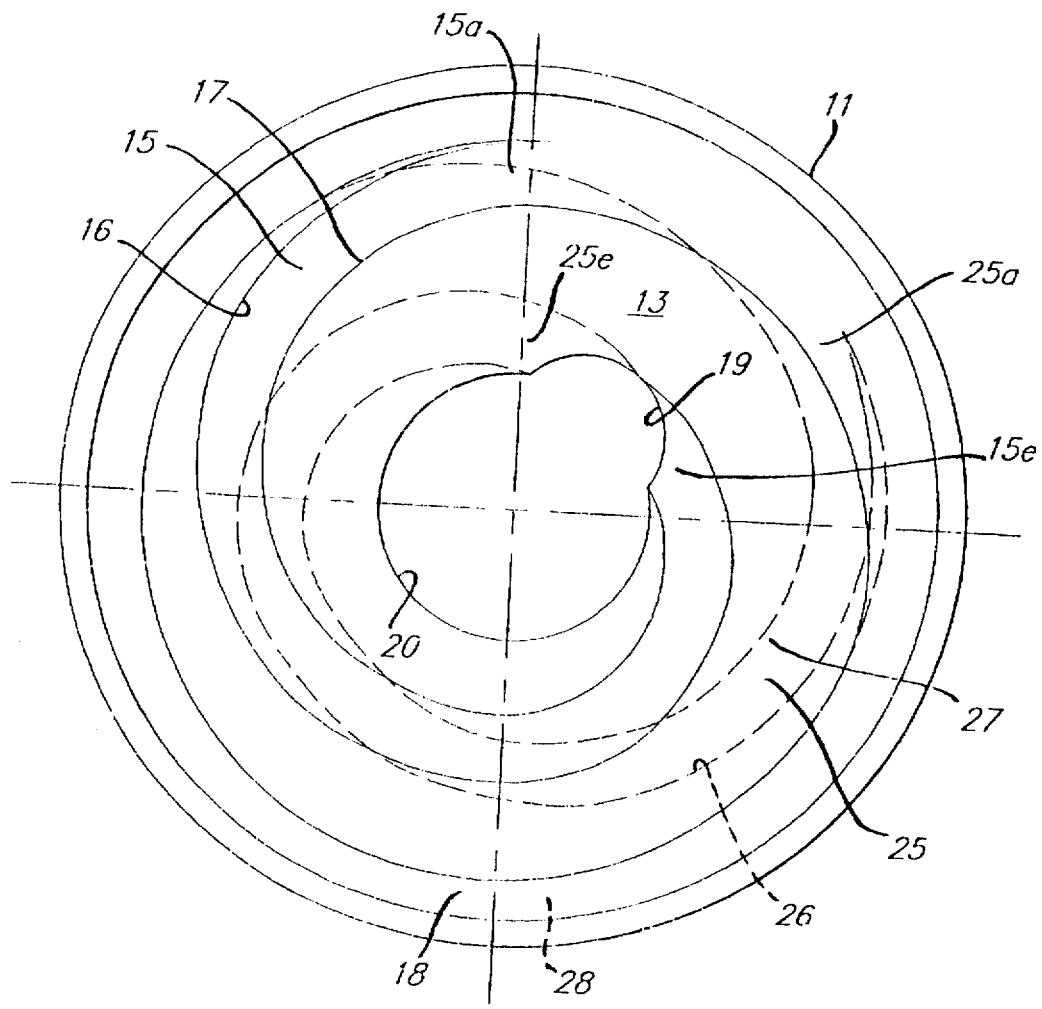
FIG. 2 is a plan view of a first embodiment of a disc which forms the rotational member of a coupling in accordance with the invention and whose first end face comprises a groove forming a first shear channel and whose second end face comprises a groove forming a second shear channel.

As the applications shown here are not based on relative linear movements but on relative rotational movements, the grooves forming the shear channels are preferably designed as illustrated in FIGS. 2 and 9.

FIG. 2 shows a disc 11 whose visible end face 13 comprises a groove 15 with side walls 16, 17, which groove 15, together with a planar counter face, forms a shear channel which is spiral-shaped. The beginning 15a of the groove is positioned near the disc edge and runs into an annular groove 18 serving as a reservoir. The end 15e of the groove positioned near the axis runs into an axially extending recess 19 which extends between the two end faces of the disc 11 and connects the shear channel with the reverse side of the disc 11. The central bore 20 of the disc is sealed relative to an axle to which the disc has to be drivingly secured.

On the reverse side, there is shown a further groove 25 with sides walls 26, 27, which is illustrated in dashed lines and which, together with a planar counter face, may form a further shear channel. Said groove 25 is spiral-shaped and extends in the direction opposite to that of groove 15. The beginning 25a of groove 25, on the outside, also runs into an annular groove 28, and its end 25e is also connected to the recess 19. If the disc rotates clockwise (see arrow) relative to a counterface which is firmly positioned on its end face 13, the medium in the shear channel is conveyed from the beginning 15a to the end 15e of the groove 15. In other words, as a result of the rotation of the disc, the medium adhering to the fixed counter face is drawn through the shear channel. In the final analysis, a medium supplied from the annular groove 18 is conveyed across the recess 19 onto the reverse side of the disc 11. When the direction of rotation is reversed, the groove 25 has exactly the opposite effect on the reverse side due to the corresponding design of the latter, i.e. the medium is conveyed from the annular groove 28 across the shear channel on the reverse side of the disc from the beginning 25a to the end 25e of the groove and across the recess 19 on the front side of the disc.

FIG. 3 shows a coupling 31 in accordance with the invention comprising a plate coupling 32. The outer plates 33 are non-rotatably connected to the multiple-part housing 35 of the coupling, said housing forming the first part of the coupling. The inner plates 34 arranged alternately thereto are non-rotatably connected to the second coupling part designed as a hub 36. The housing 35 and hub 36 are sealed relative to one another. The housing is provided with a piston 37 which is non-rotatably connected thereto and which forms a chamber 40 together with a wall 38 associated with the housing. A disc 41 which is non-rotatably connected to the hub 36 rotates in the chamber and, in principle, is designed as the disc 11 shown in FIG. 2. The disc surfaces are provided with a recess 49 positioned close to the axis as well as spiral grooves 45, 55 forming shear channels.

Figure 4:
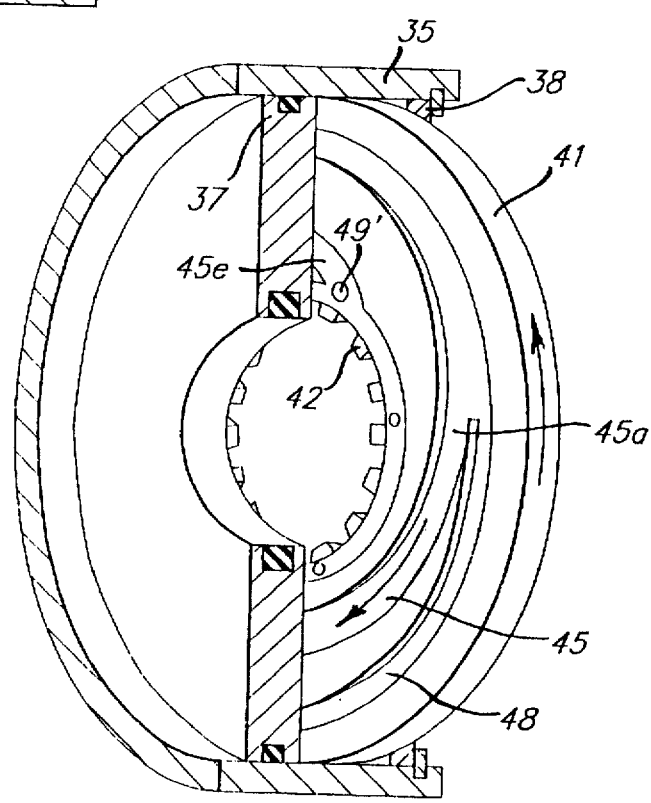
FIG. 4 shows details of the coupling according to FIG. 3 in an inclined view, with part of a piston being cut away.

FIG. 4 shows part of the housing 35, the piston 37 rotating therewith and the wall 38 positioned therebehind and associated with the housing—with one half of all parts being cut away. Between the piston 37 and the wall 38 there is positioned a disc 41 whose details are substantially similar to those shown in FIG. 2. The Figure also shows an outer annular groove 48 serving as a reservoir and a spiral-shaped groove 45. The latter extends between its beginning 45a and its end 45e and, together with the counter face of the piston 37, forms a shear channel. In the present case, the connection between the end 45e of the groove and the reverse side of the disc is established by a plurality of axial bores 49, which take the place of the open recesses 49 according to FIG. 3. The anti-clockwise direction of rotation of the disc relative to the housing is indicated by the first arrow and the resulting clockwise conveying direction in the shear groove is indicated by a second arrow. The latter conveying direction only applies relative to the disc.

FIG. 5 shows part of FIG. 3 in the region of the disc 41, with the axial distance between the disc 41 and the piston 37 or the wall 38 being exaggerated. The disc 41 is axially movably connected to the hub 36 by shaft toothing 42. In the case of a first direction of relative rotation between the hub and housing (FIG. 5a), the shear channel formed by the groove 55 conveys medium to the lefthand side of the disc, as a result of which the piston 37 is loaded by the pressure of the medium and, in turn, loads the plate coupling 32. When the housing 35 and hub 36 rotate relative to one another in the opposite direction, the shear channel formed by the groove 45 becomes effective and conveys medium across the recess 49 on to the righthand side of the disc. As a result of the excess pressure generated in said region, the end face of the disc is pressed against the end face of the piston 37, thereby effectively sealing the groove 45. As a result, the piston is loaded by the disc directly and displaced towards the left while, in turn, loading the plate coupling 32. The coupling is thus actuated every time there occurs a speed differential between the two parts of the coupling 31, i.e. if the housing 35 rotates relative to the hub 36. As a function of the direction of relative rotation, either the one or the other shear groove becomes effective, and it therefore becomes obvious that by designing the two shear grooves in different ways, it is possible, as a function of the driving condition, to achieve different coupling characteristics, especially it is possible to eliminate or reduce the locking effect when braking the vehicle or to achieve the highest possible locking effect for the purpose of improving traction when starting and accelerating the vehicle.

FIG. 6 shows a coupling which is substantially identical to that illustrated in FIG. 3. Any details corresponding to one another have been given the same reference numbers. To that extent, reference is therefore made to the description of FIG. 3. In addition, the housing 35, on the plate coupling 32 end opposite the piston 37, is provided with a recess 50 holding a plate spring 51 which is supported on the housing and loads the plate coupling 32 with a pretension $F_p$. Only after having overcome said pretension will the plate coupling rigidly support itself on the housing 35. This will influence the coupling characteristics in a way to be explained later.

FIG. 7 shows a coupling which substantially corresponds to that illustrated in FIG. 3. Any details corresponding to one another have been given the same reference numbers. To that extent, reference is made to the description of FIG. 3. In addition, the piston 37', on its side opposite the plate 41, is provided with a recess 50' which holds a plate spring 51'. Said plate spring 51' is supported in the housing 35 by means of a securing ring and loads the piston 37' with a pretension $F_c$. Only after having overcome said pretension will the piston 37' load the plate coupling. The plates of the plate coupling 32, on the other side, are rigidly supported on the housing 35. This results in coupling characteristics which will be explained later.

Figure 8A:
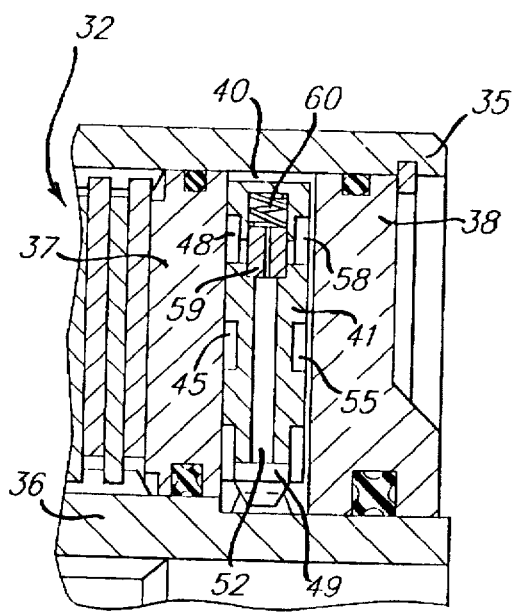

FIG. 8a, in the form of half a section, shows part of a coupling according to the illustrations in FIG. 5, substantially showing the housing 35 between the wall 38 and the piston 37 with the disc 41. The hub 36 and part of the friction coupling are also identifiable. Inside the disc 41 there is provided a radial short circuit channel 52 connecting the recess 49 to the two annular grooves 48, 58 at the outer edge of the disc and to the respective beginnings of the grooves 45, 55 forming the shear channels. The channel 52 is controllable by a slide 59 which closes under the force of a spring 60 and opens under the influence of centrifugal forces. Optionally, only one of the two grooves 45, 55 forming the two shear channels may be provided with a short circuit channel.

Figure 8B:
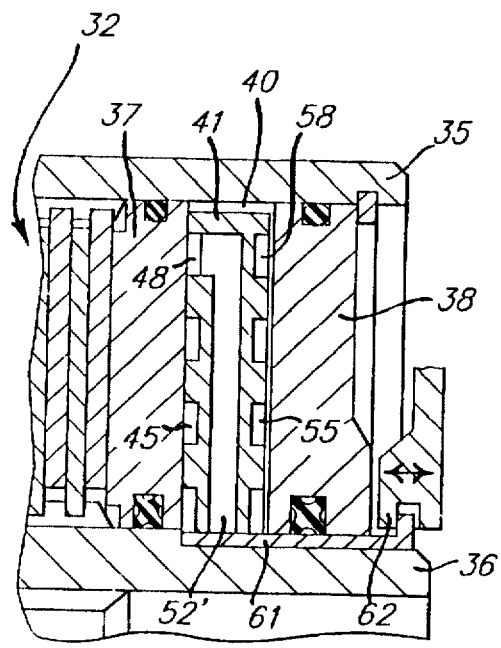

FIG. 8b substantially shows the same portion of a coupling as illustrated in FIG. 8a. In this case, a radial short circuit channel 52' in the disc only establishes the connection between the inner recess (not identifiable) and the outer annular grooves 48 and the beginning of the groove 45 forming a shear channel. At its radially inner end, the cross-section of the short circuit channel 52 may be opened and closed by a slide 61 actuated by a claw 62.

FIG. 9 shows a disc 111 whose visible end face 113 is provided with a groove 115 with side walls 116, 117, which, together with a planar counter face, forms a shear channel which is spiral-shaped. The beginning 115a of the groove is positioned near a central bore 120 and ends in a bore 119 leading to the reservoir. The groove end 115e positioned near the edge runs into the outer edge of the disc 111, which outer edge forms an annular gap relative to the housing and connects the shear channel with the other side of disc 111. The central bore 120 of the disc is sealed relative to a hub to which the disc has to be drivingly secured. The central bore 120 for inserting a hub is provided with toothing means 142.

It has to be assumed that on the reverse side there is provided a further groove 125 which, together with a planar counter face, is able to form a further shear channel. On the outside, it also runs with its end 125e into the outer edge of the disc 111, while its beginning 125a is connected to the reservoir by means of the bore 119. If the disc rotates clockwise relative to a counter face firmly resting on its end face 113, the medium in the shear channel is conveyed from the beginning 115a to the end 115e of the groove 115. Expressed in a different way, the medium adhering to the fixed counter face is drawn through the shear channel as a result of the rotation of the disc. In the process, medium emerging from the bore 119 is finally conveyed over the edge on to the reverse side of the disc 111. When the direction of rotation is reversed, the groove 115 on the reverse side, because it extends in the opposite direction, achieves exactly the opposite, i.e. medium is conveyed from the bore 119 along the shear channel on to the reverse side of the disc from the beginning 125a to the end 125e of the groove and over the edge on the front side of the disc. The connection between the bore 119 and the reservoir is not identifiable in the longitudinal section and has to be assumed to be positioned in a different plane.

FIG. 10 shows a coupling in accordance with the invention which comprises a multi-plate coupling 132. The outer plates 133 are non-rotatably connected to the multi-part housing 135 of the coupling, which forms the first part of the coupling. The inner plates 134 alternately arranged thereto are nonorotatably connected to the second coupling part designed as a hub 136.

The housing 135 and hub 136 are sealed relative to one another. A piston 137 is accommodated in the housing and non-rotatably connected thereto and, together with a wall 138 associated with the housing, it forms a chamber 140. In the chamber 140, there rotates a disc 141 which, in principle, is designed like the disc 111 according to FIG. 9, and which is non-rotatably connected to the hub 136 by means of toothing means 142. The Figure shows a bore 149 positioned near the edge and spiral grooves 145, 155 in the surfaces of the disc, which grooves form shear channels. The bore 149 is provided with a valve member 150 which, together with steps in the bore, forms alternately operating return valves. A radial connecting channel 151 starts from the bore 149 and leads to a reservoir 152 which may be designed as an annular space in the two-part disc member for example. The reservoir contains a gas-proof hollow member 153 which is adapted to the shape of the reservoir 152; for example, it is also annular in shape. In the embodiment provided with a bore 149 near the edge as illustrated here, the medium flows from the end of the shear channel to the other side of the disc through an axial annular gap 154 in the vicinity of the hub, which gap is formed by the toothing means 142.

In the case of a first direction of relative rotation between the hub and housing, the shear channel formed by the spiral groove 155 conveys medium to the lefthand side of the disc, as a result of which the piston 137 is loaded by the pressure of the medium and, in turn, loads the multi-plate coupling 132. When the housing 135 and the hub 136 rotate relative to one another in the opposite direction, the shear channel formed by the spiral groove 145 becomes effective and conveys medium across the annular gap 154 onto the righthand side of the disc. As a result of the excess pressure generated in said region, the end face of the disc is pressed against the end face of the piston 137 thereby effectively sealing the spiral groove 145. As a result, the piston 137 is loaded directly by the disc and displaced towards the left, while, in turn, loading the multi-plate coupling 132. The coupling is thus actuated every time there occurs a speed differential between the two parts of the coupling 131, i.e. when the housing 135 rotates relative to the hub 136. As a function of the relative direction of rotation, either the one or the other shear channel becomes effective, and it therefore becomes obvious that by designing the two spiral grooves in different ways it is possible, as a function of the driving condition, to achieve different coupling characteristics; in particular, it becomes possible to eliminate or reduce the locking effect when braking the vehicle or to achieve the highest possible locking effect for the purpose of improving traction when starting and accelerating the vehicle.

FIG. 11 shows the disc members 141 in the form of details, each consisting of two halves 141a, 141b. The axial bore 149, which is relatively close to the edge, axially movably guides the valve member 150. On both sides of the disc, the bore 149 opens into the beginning 145a, 155a of the spiral-shaped groove 145, 155 which, together with a contacting counter face of a housing, may form a shear channel. The central through-bore 160 is provided with driving or toothing means 142 for being non-rotatably connected to the hub of the coupling. Between the axial bore 149 and a reservoir 152 existing between the two halves 141a, 141b, there is provided a radial connecting channel 151. As a function of the pressure, the valve member 150 moves in such a way that either the one or the other shear channel is connected to the reservoir 152 by means of the beginning 145a, 155a of the respective spiral groove. All the above details are shown in FIG. 11. The reservoir serves to compensate for changes in volume to ensure that the chamber is completely gas-free under all conditions, for instance if the volume of the viscous medium changes as a function of pressure or temperature or if the geometric conditions of the chamber boundaries change.

Figure 11A:
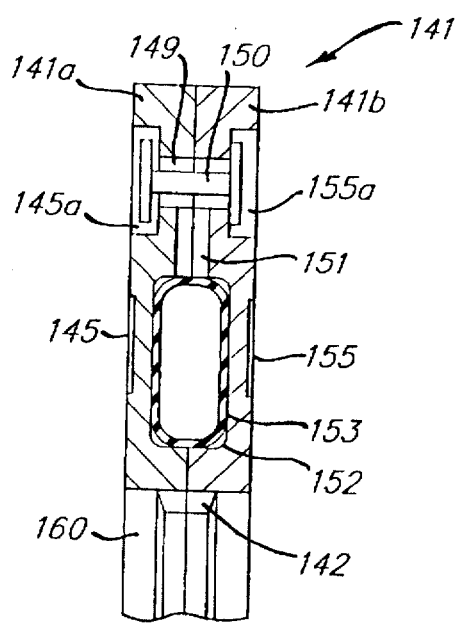

In FIG. 11a, a gas-proof, gas-filled hollow member 153 is incorporated into the reservoir 152 for compensating for any changes in volume, so that its effective capacity for viscous medium is variable.

Figure 11B:
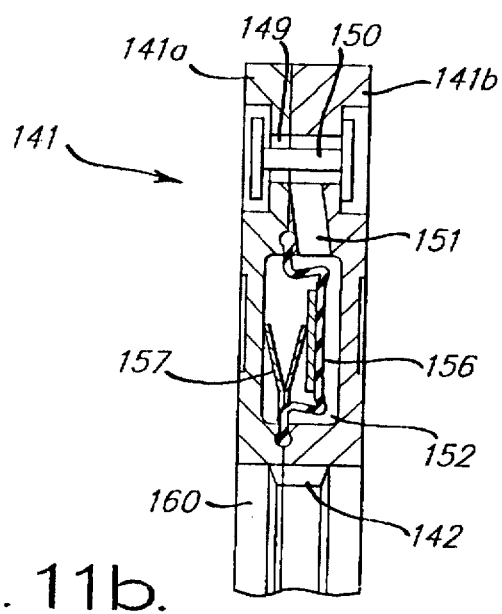

In FIG. 11b, the reservoir 152 is divided in the centre by a membrane 156 which is clamped in between the halves 141a, 141b and which, for the purpose of reducing the size of the reservoir half connected to the channel 151, is pretensioned by a plate spring assembly 157.

Figure 11C:
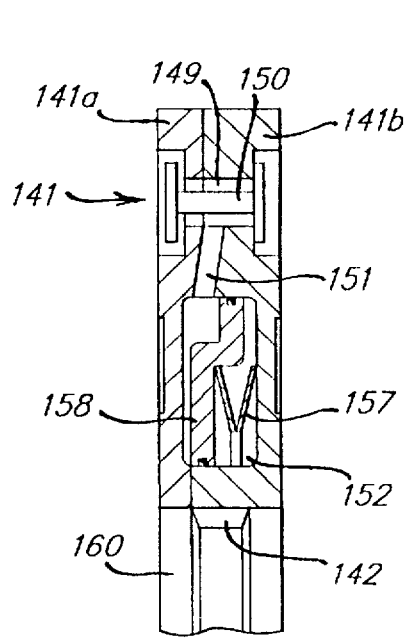

In FIG. 11c, the reservoir 152 is divided in the centre by a movable annular piston 158 which is sealed relative to the side walls of the reservoir 152 and which is also pretensioned in the direction of the reservoir half connected to the channel 151 by a plate spring assembly 157.

Figure 11D:
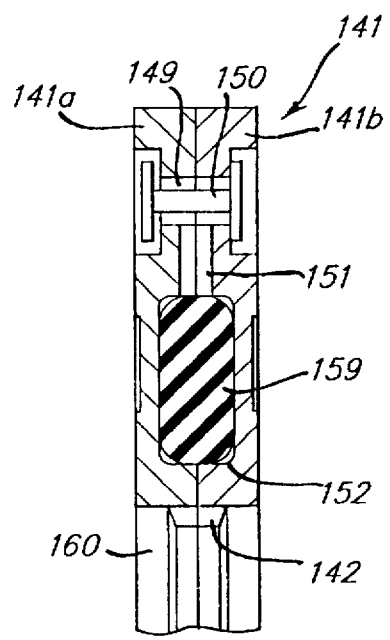

In FIG. 11d, for the purpose of compensating for any changes in volume, a resilient solid member 159 whose volume is variable and which comprises a gas-proof surface is inserted into the reservoir 152, so that its effective capacity for viscous fluid is variable.

FIG. 12 shows part of the coupling 131, indicating the multi-part, differently designed housing 135 and the hub 136. The movable piston 137 is visible in the housing 135. The above-mentioned parts form the chamber 140 in which there rotates a two-part disc member 141 non-rotatably connected to the hub 136 by toothing means 142. The Figure also shows individual outer plates 133 and inner plates 134 of a multi-plate coupling, which are acted upon by the piston 137. The housing 135 and hub 136 are supported relative to one another by a ball bearing 170. A bore 162 closed by a screw 161 serves to fill the chamber 140. The disc 141 shows the details already explained in connection with FIG. 10, i.e. an axial bore 149 positioned in the vicinity of the hub between the ends of the grooves 145, 155, comprising a valve member 150 guided therein and a radially inwardly extending annular chamber 151 which, by means of a connecting channel 166 in the disc and close to a shaft opens inwardly into an annular gap 154 in the housing. Said gap provides the connection with a reservoir 152 which in this embodiment is reduced a zero volume and which is delimited by an annular piston 162 which is loaded by a plate spring 164. The annular piston 163 and housing 135 are rotationally secured relative to one another by a pin 65.

FIG. 13, in the same way as FIG. 12, shows a coupling 131 which, however, is designed differently and which comprises an integrated multi-plate coupling 132, with a multi-part disc member 141 being held in a multi-part housing 135 in a chamber 140. The disc member 141 is non-rotatably connected to the hub 136 by toothing means 142. The chamber 140 is delimited by a piston 137 which axially acts on the friction coupling 132 with its outer plates 133 and inner plates 134. The piston 137 acts against the force of a plate spring 167. A bore 162 closed by a ball 171 serves to fill the chamber 140. The disc 141 shows the details already explained in connection with FIG. 10, i.e. an axial bore 149 arranged near the hub between the ends of the grooves 145, 155 with a valve member 150 guided therein and a radially inwardly extending annular space 151 which, by means of a connecting channel 166 provided in the vicinity of a shaft in the disc, opens inwardly into an annular gap 154 in the housing. Said gap provides the connection with a reservoir 152 which in this embodiment is reduced to a zero volume and which is delimited by an annular piston which is loaded by a plate spring 164.

The disc member 141 may be provided with special integral sealing lips for sealing same relative to the housing 135.

The details in FIGS. 12 and 13 not referred to in details correspond to those shown in FIG. 10 and have the same reference numbers.

FIG. 14 shows a coupling 71 in accordance with the invention according to the second type which comprises a viscous coupling 72. The coupling consists of a multi-part housing 75 and a hub 76 which are sealed relative to one another and form the chamber 91 of the viscous coupling 72. The outer plates 73 of the viscous coupling are non-rotatably connected to the housing 75, whereas the inner plates 74 are non-rotatably connected to the hub 76. At its end, the chamber is closed by a wall 78 which is firmly connected to the housing 75 and which is in contact with a disc 81 non-rotatably connected to the hub 76. The front end of the disc 81 is provided with a groove 85 which forms a shear channel with the counter face of the wall 78. Furthermore, the housing 75 accommodates a movable annular piston 79 which is supported by a plate spring 93. Between the wall 78 and the annular piston 79 there is formed a compensation chamber 92 which, by means of an axial bore 90 in the wall 78, is connected to the outer end of the groove 85 forming a shear channel. The inner end of the groove 85 forming the shear channel is connected to the interior of the chamber 91 by an axial bore 89.

Further details may be found in FIG. 15. Part of the housing 75, and wall 78 and the annular piston 79 are partially cut away. The disc 81 is shown in an inclined view. An annular groove 88 is identifiable in the edge region; furthermore, there is shown the spiral-shaped groove 85 with its beginning 85a on the radial outside and its end 85e on the radial inside, with the groove 85 forming the shear channel together with the counter face of the wall 78. At the end 85e of the groove 85 there is provided an axial bore 89 which provides a connection with the counter side and thus with the interior of the chamber 91 of the viscous coupling 72. The wall 78 secured to the housing is provided with axial bores 90 which establish connections between the annular groove 88 and thus the beginning 85a of the groove and the compensation chamber 92 positioned to the left of the wall 78. Depending on the direction of relative rotation between the coupling housing 75 and the hub 76 and thus between the disc 77 and the wall 81, the assembly conveys medium from the coupling chamber 91 into the compensation chamber 82 or vice versa. In the case of the anti-clockwise direction of rotation of the disc 81—as indicated by the arrow—medium is conveyed in the direction as indicated by the further arrow from the beginning to the end of the spiral groove 85, and thus from the compensation chamber 92 into the interior of the viscous coupling.

FIG. 16 shows possible characteristic curves C of coupling types in accordance with the invention, with the indeces of the characteristic curves referring to the respective drawing numbers of the couplings. In each case, the torque is given as a function of the differential speed. For comparative purposes there is shown a very much flatter curve $C_{vc}$ of an uncontrolled viscous coupling according to the state of the art.

FIGS. 17 and 18 each show a plan view of a motor vehicle 201, 301, with the following details being identifiable: the motor vehicle is provided with two front wheels 202, 302 which are driven by the parts of a front axle 203, 303 having an axle differential 204, 304 and with two rear wheels 205, 305 which are driven by the parts of a rear axle 206, 306 having an axle differential 207, 307. Said vehicle comprises a transversely fitted front internal combustion engine 208, 308 which constitutes the driving source and which is connected to a multi-stage or continuously controllable transmission gear 209, 309 adapting the speed range of the internal combustion engine to the speed range of the motor vehicle.

In FIG. 17, the output end of the reduction gear 209 is connected to the input end of the axle differential 204 of the front axle 203 and, by means of a through-drive, to a coupling unit 210 which operates at the same speed and which, by means of a propeller shaft 211, drives the input end of the differential 207 of the rear axle 206. The torque introduced is distributed to the wheels of the respective axle shaft by the axle differentials 204, 207. The axle differentials 204, 207 may each be equipped with a coupling of one of the two types in accordance with the invention, with one of the parts rotatable relative to one another being formed by the differential carrier or one of the axle shaft gears, and with the other one of the parts rotatable relative to one another being formed by the other of the axle shaft gears. The coupling 210 may be as proposed by the invention, with one of the parts rotatable relative to one another being formed by the driving parts of the transmission gear 209 and the other one of the parts rotatable relative to one another being formed by the connecting parts of the propeller shaft 211.

In FIG. 18, the motor vehicle deviates from that shown in FIG. 17 in that it comprises a central differential drive 310 whose input end, by means of a through-drive, is connected to the output end of the transmission gear 309. The central differential drive 310 distributes the introduced torque to the axle differential 304 of the front axle 303 and to the axle differential 307 of the rear axle 306. Each of the said differential drives, the axle differential drives 306 and 307, and the central differential 310 may be equipped with one of the coupling types as proposed by the invention, with one of the two parts rotatable relative to one another being formed by the differential carrier or one of the axle shaft gears and the other one of the parts rotatable relative to one another being formed by the other one of the axle shaft gears.

What is claimed is:

1. A method of controlling the transmission of torque between two relatively rotatable parts comprising providing a friction coupling having friction elements alternately and non-rotatably connected to respective ones of said parts, providing a piston working in a chamber to load said coupling, providing a reservoir containing viscous fluid, providing a shear channel extending circumferentially between two ends, connecting respective ends of said shear channel to said reservoir and said chamber, laterally sealing said channel, bounding said channel by two walls which rotate with said respective parts and loading said coupling by relatively rotating said parts to convey viscous fluid by shear forces along said shear channel from said reservoir to said chamber.

2. A method of controlling the transmission of torque between two relatively rotatable parts by providing a viscous coupling having plates alternately and non-rotatably connected to respective ones of said rotatable parts and which are arranged in a chamber containing viscous fluid, providing a reservoir containing viscous fluid externally of said chamber, providing a shear channel extending circumferentially between two ends, connecting respective ends of said shear channel to said reservoir and said chamber, laterally sealing said channel, bounding said channel by two walls which rotate with said respective parts, and varying the pressure or fill factor of the coupling by relatively rotating said parts to convey viscous fluid by shear forces along said shear channel between said reservoir and said chamber.

3. A coupling assembly for transmitting torque between first and second rotatable parts comprising a friction coupling having mutually engagable elements alternately and non-rotatably connected to respective ones of said first and second parts;

a chamber formed by the first rotatable part and filled with a viscous fluid;

a piston mounted in said chamber and movable to load the friction coupling to cause said friction elements to engage;

a first pump member forming part of or connected to the first rotatable part to rotate therewith;

a second pump member forming part of or connected to the second rotatable part to rotate therewith;

a generally circumferential, laterally sealed, shear channel formed by and between said pump members;

a reservoir for the viscous fluid; and two ports in one of the pump members spaced apart along the channel, one of the ports communicating with the reservoir and the other of the ports communicating with the chamber so that upon relative rotation between the pump parts viscous fluid is conveyed by shear force from the reservoir through one of the ports, along the channel and through the other of said ports into the chamber.

4. A coupling assembly according to claim 4 in which said reservoir is pressurised with respect to said shear channel when there is relative rotation between said pump members.

5. A coupling assembly according to claim 4 including means tending to minimize the volume of the reservoir.

* * * * *

UNITED STATES PATENT AND TRADEMARK OFFICE
CERTIFICATE OF CORRECTION

PATENT NO. : 5,706,923
DATED : January 13, 1998
INVENTOR(S) : THEODOR GASSMANN

It is certified that error appears in the above-identified patent and that said Letters Patent are hereby corrected as shown below:

Column 1, line 27, after "other", please insert --of the--.
Column 2, line 38, after "method", please insert --and device--.

Signed and Sealed this

Fifteenth Day of May, 2001

Attest:

NICHOLAS P. GODICI

Attesting Officer     Acting Director of the United States Patent and Trademark Office